United States Patent [19]

Kime

[11] 4,317,048

[45] Feb. 23, 1982

[54] ENERGY FARM

[76] Inventor: Wellesley R. Kime, 8745 Appian Way, Los Angeles, Calif. 90046

[21] Appl. No.: 164,743

[22] Filed: Jun. 30, 1980

Related U.S. Application Data

[63] Continuation-in-part of Ser. No. 158,415, Jun. 11, 1980.

[51] Int. Cl.³ .................. F03B 13/10; F03B 13/12; H02P 9/04
[52] U.S. Cl. .................................. 290/53; 290/54; 60/424; 60/720
[58] Field of Search .................. 290/40, 42, 43, 44, 290/52, 53, 54, 55; 60/335, 424, 700, 701, 707, 711, 715, 720, 468, 494; 415/27, 28, 39, 40, 43, 152 R, 152 A

[56] References Cited

U.S. PATENT DOCUMENTS

| | | | |
|---|---|---|---|
| 956,570 | 5/1910 | Day | 60/424 |
| 988,508 | 4/1911 | Reynolds | 416/79 |
| 2,871,790 | 2/1959 | Weills | 290/53 |
| 4,206,608 | 6/1980 | Bell | 60/698 |

*Primary Examiner*—J. V. Truhe
*Assistant Examiner*—Shelley Wade

[57] ABSTRACT

An energy conversion apparatus and method for the transfer and utilization of kinetic energy received by one or more natural kinetic energy receptors from one or more "natural kinetic energy source" such as for example solar energy, wind energy, water currents and tides, geothermal energy and the like, for powering one or more electricity generating devices. The "natural kinetic energy" is converted into fluid pressure by "receptor(s)" coupled with hydraulic fluid pressure pump(s). Back flow of fluid is prevented from flowing through the non-operating fluid pumps by check valve(s). The fluid pressure is used to operate one or more fluid pressure motors coupled with electricity generating unit(s). When first and second fluid pressure motors are used, means is provided for directing all of the fluid under pressure through the first pressure motor until it is operating at a desired speed before fluid pressure is permitted to operate the second pressure motor. A valving system permits flow between one unidirectional conduit and a second unidirectional conduit through two bridging conduits so that a bi-directional pump may be used between them.

6 Claims, 12 Drawing Figures

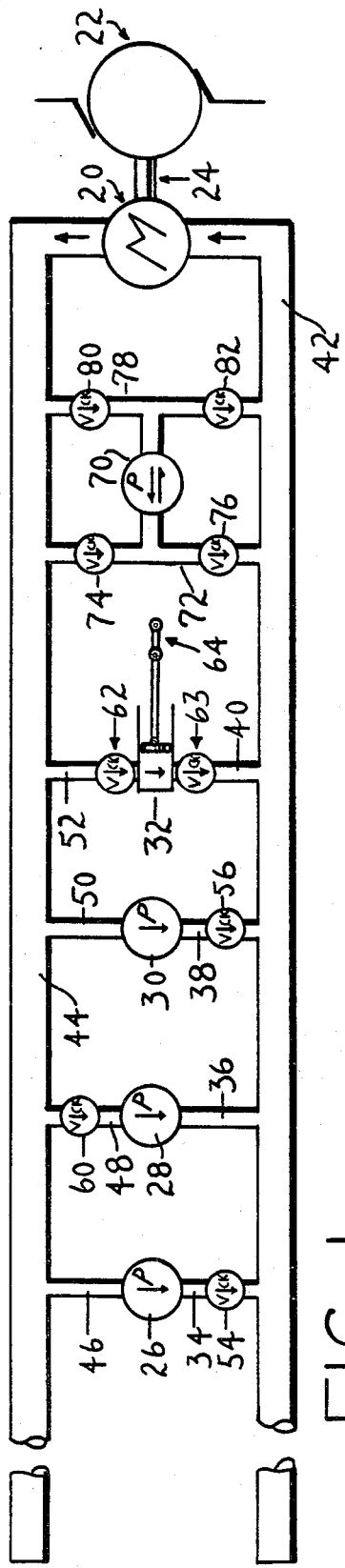
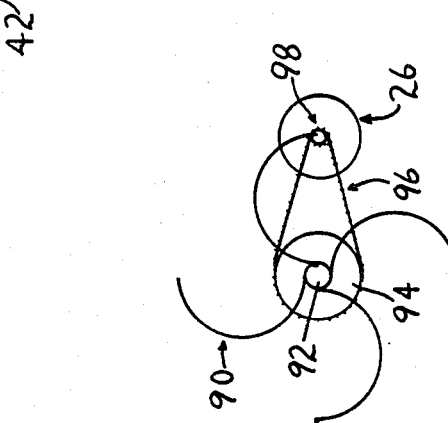
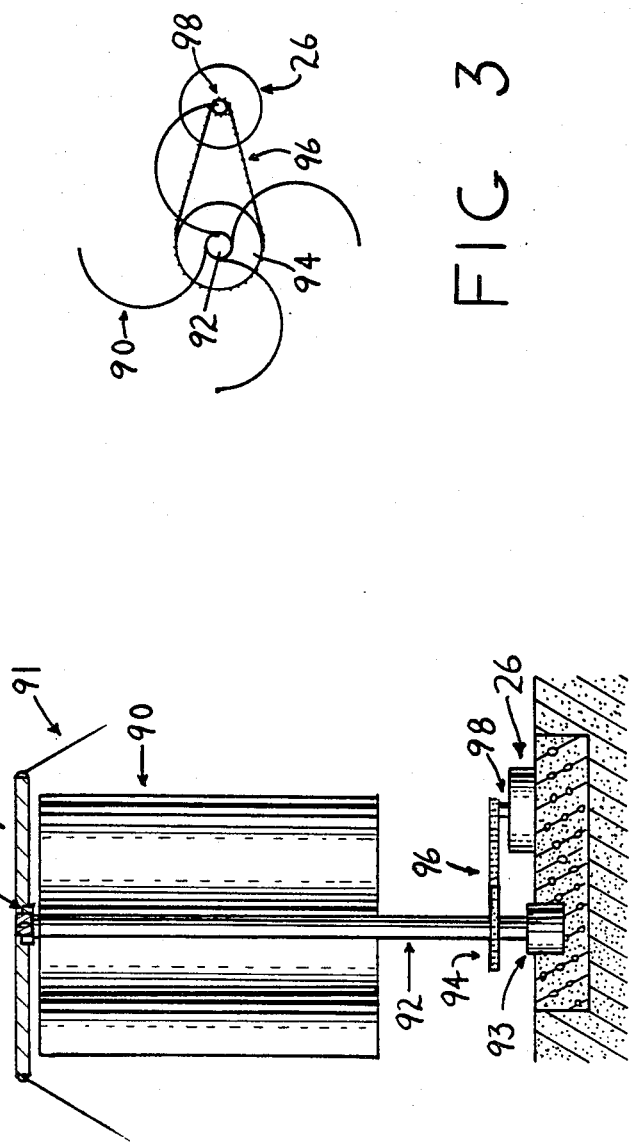

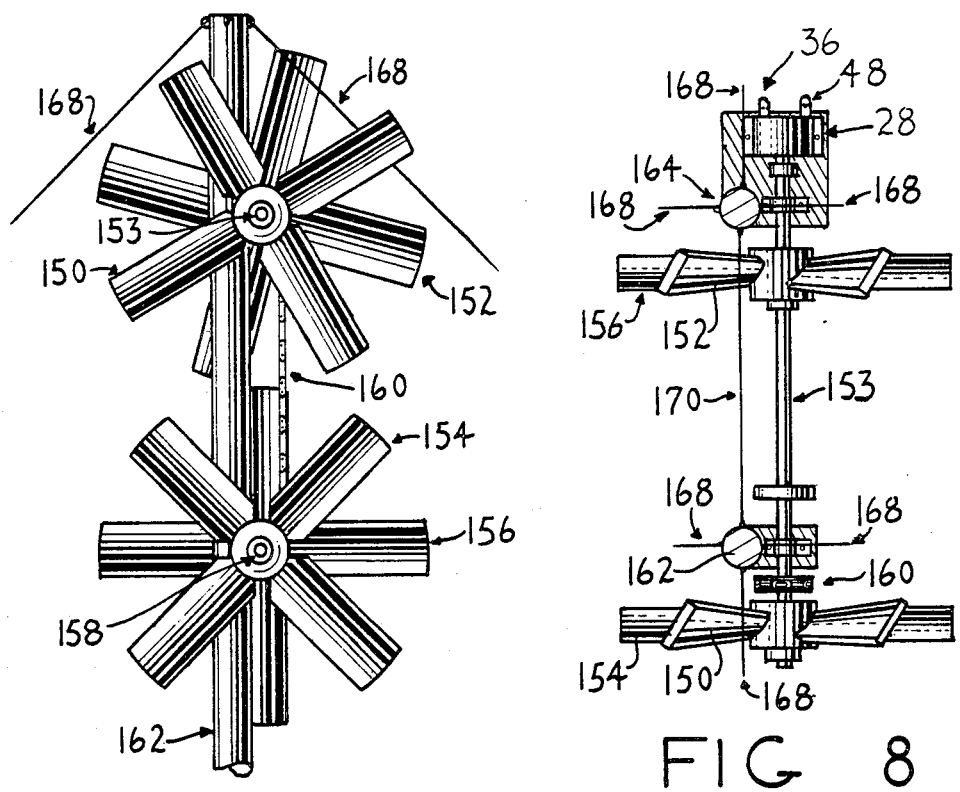
FIG 7
FIG 8
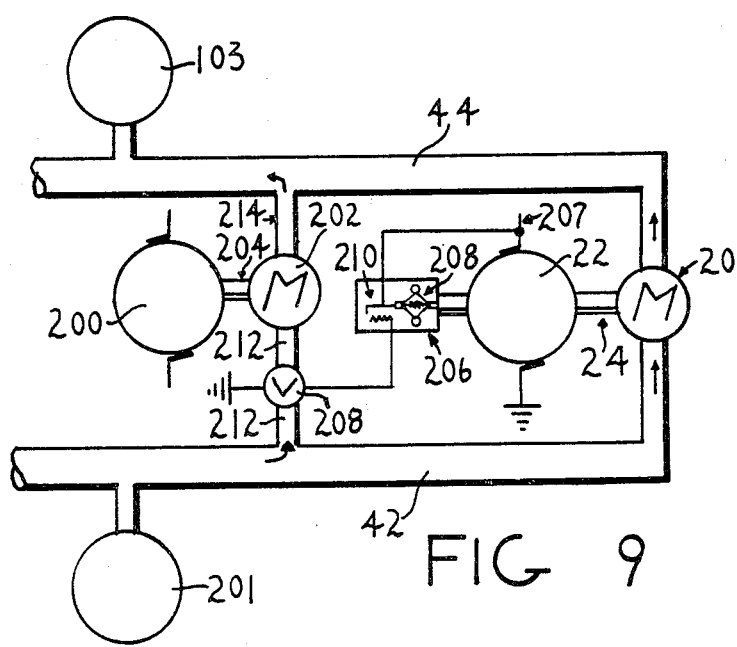
FIG 9

ENERGY FARM

CROSS-REFERENCE TO RELATED PATENT APPLICATIONS

This is a continuation-in-part of my former application entitled "ENERGY CONVERSION APPARATUS AND METHOD" filed June 11, 1980, application Ser. No. 158,415.

BACKGROUND OF THE INVENTION

The energy crisis has necessitated the need for more versatile means to utilize natural kinetic energy sources as usable energy. In this specification and the appended claims, the term "natural kinetic energy sources" refers to wind, natural water currents and tides, geothermal energy, and the temperature difference between the surface water and deeper ocean waters and the like. Means are known to the art for converting these kinetic energy sources into usable energy sources, as for example windmills to harness energy from the wind, paddle wheels to harness energy from the movement of water, solar devices for utilizing heat from the sun, and geothermal devices for utilizing the energy below the surface of the earth to generate vapor pressure to operate pressure motors and the like.

It would be advantageous to have an apparatus and method for utilizing the energy from at least one natural energy receptor for powering at least one electricity generating device, although the natural energy receptor(s) may receive energy from different natural energy sources. For example, the apparatus would utilize energy from the wind or the sun or currents of water (or the like) for powering one or more electricity generating device so that electricity will be available if there is appreciable wind but the sun is not shining etc. In this specification and the appended claims, the term "electricity generating device" refers to a generator, alternator, or any suitable device for generating electricity. The present invention, by utilizing a fluid to transfer energy, provides means to combine energy obtainable from a plurality of natural kinetic energy receptors and means to utilize energy in tides and water currents of changing directions.

SUMMARY OF THE INVENTION

The object of the invention is to provide an apparatus and method for an energy farm for converting energy from at least one natural kinetic energy source into rotational energy for operating a pressure motor for powering at least one electricity generating device. Typically, hydraulic pumps and motors are used for the transfer of power, however, any suitable fluid pump and motor may be used, as for example pneumatic devices.

An object of the invention is to provide a first common conduit for the return of fluid from at least one pressure motor to at least one fluid pressure pump and a second common conduit for the flow of fluid under pressure from the pressure pump(s) to the pressure motor(s). First and second communicating conduits respectively are provided for the flow of fluid from the first common conduit to the pump(s) and from the pump(s) to the second common conduit.

One or more check valves are provided to prevent the back-flow of hydraulic fluid from the second common conduit to the first common conduit through the pump(s). Thus, fluid under pressure will transfer energy to the pressure motor(s) if one or more pump is being powered by natural kinetic energy receptor(s).

Another object of the invention is to provide a means for converting back and forth movement of tides and other water movements into unidirectional fluid pressure for use in the energy farm.

Further objects, features, and advantages of the invention will become readily apparent from the following description when taken in connection with the attached drawings, in which:

BRIEF DESCRIPTION OF THE DRAWINGS

FIG. 1 is a diagramatic representation of a view looking downward on an energy farm embodying the present invention having a plurality of fluid pumps available for powering one pressure motor coupled to one electricity generating unit.

FIG. 2 is a diagramatic representation of a plan view of a type of vertical windmill for powering a fluid pump as an example of a wind energy receptor which may be used in the energy farm.

FIG. 3 is a top view of FIG. 2, looking downward.

FIG. 7 is a plan view of a horizontal compound wind receptor having a plurality of propeller type wind receptors coupled together by shafts and a drive chain. The compound wind receptor powers a pressure pump.

FIG. 8 is a top view looking downward on the wind receptor of FIG. 7, showing the device powering a fluid pump for use in the energy farm.

FIGS. 9 through 12 show diagramatic representations of a portion of the energy farm having first and second pressure motors for powering first and second electricity generating devices. FIG. 9 shows a governor operated control unit coupled with the first electricity generating device for tending to maintain the speed of rotation of the shaft of the first electricity generating device by controlling the flow of fluid under pressure to the second electricity generating device via valve means. FIG. 10 shows a control switch for controlling the speed of the first electricity generating device electrically coupled to the first electricity generating device by controlling the flow of fluid under pressure to the second electricity generating unit. FIG. 11 shows a constant pressure input valve for controlling the flow of fluid under pressure to the second electricity generating unit.

FIG. 12 shows means for controlling the first electricity generating unit by diverting outflow fluid through the second pressure motor when the rotational speed of the first pressure motor has reached a desired RPM as determined by a governor operated switch or by qualities of the electrical output of the first electricity generating unit.

DESCRIPTION OF THE PREFERRED EMBODIMENT

Figure 5:
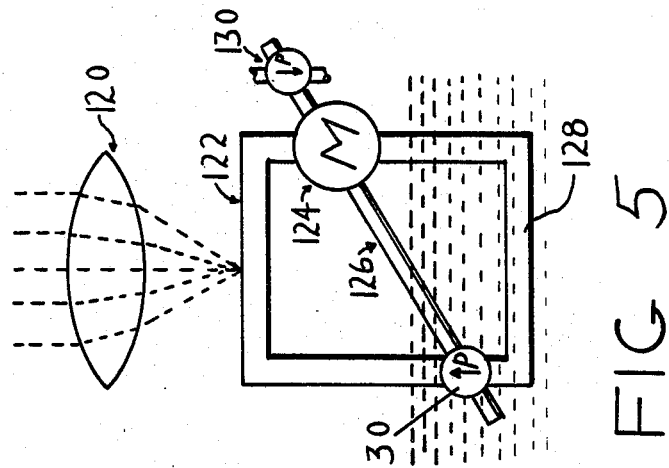
FIG. 5 is a schematic representation of a solar energy receptor for powering a fluid pressure motor for providing a source for rotational energy which may be used in the energy farm for powering a pressure pump.

Turning now to the drawings in which like reference numerals index like parts, FIG. 1 shows a diagrammatic representation of an energy farm having pressure motor 20 for powering electricity generating unit 22 via shaft 24. Any suitable coupling or transmission for changing the ratio of rotational speed of the pressure motor and electricity generating unit may be used although not shown. Hydraulic fluid flows from first common conduit 44 via communicating conduits 46, 48, 50, and 52 respectfully to hydraulic fluid pumps 26, 28, 30, and 32. The hydraulic fluid is moved through second communicating conduits 34, 36, 38, and 40 to the second common conduit 42 and then to the pressure motor 20. The hydraulic fluid returns through the system via the first common conduit 44.

A back-flow of hydraulic fluid is prevented from flowing through pumps 26 and 30 when these pumps are not in operation by check valves 54 and 56 located in the second communicating conduits 34 and 38 respectively. A back-flow of hydraulic fluid is prevented from flowing through pump 28 when not in operation by a check valve 60 located in first communicating conduit 48. Pumps 26, 28, and 30 may be of any suitable type, rotary or piston, however they typically are of the rotary gear type.

Pump 32 is shown as a piston type pump having check valves 62 and 63 for preventing backflow of fluid into the first communicating conduit and into pump 32 respectively. Hydraulic fluid is drawn into hydraulic pump 32, via the first communicating conduit 52 and is forced out of hydraulic pump 32 via the second communicating conduit 40 into the second common conduit 42. In this specification and the appended claims, the term "piston type pump" means a piston type pump having the said check valves for preventing backflow as stated above.

Rotary hydraulic fluid pump 70 is powered by a natural kinetic energy receptor which provides a back and forth rotational movement rather than rotational energy in one direction. The communicating passages and check valves are arranged so that the hydraulic fluid flows from the first common conduit 44 to the second common conduit 42 when rotary pump 70 is being powered either clockwise or counterclockwise.

This typically is accomplished as follows: A first bridging conduit 72 extends from the first common conduit 44 to the second common conduit 42 and also communicates with pump 70. The first bridging conduit 72 is provided with check valve 74 between the first common conduit 44 and the communication with pump 70 and check valve 76 between the communication with pump 70 and the second common conduit 42. The second bridging conduit 78 similarly extends between the first common conduit 44 and the second common conduit 42 and communicates with hydraulic fluid pump 70.

The second bridging conduit 78 typically is provided with check valve 80 located between the first common conduit 44 and the communication with pump 70 and check valve 82 located between the communication with pump 70 and the second common conduit 42. When the shaft of pump 70 is being rotated in one direction, fluid flows through check valves 74 and 82; when the shaft of the pump is rotated in the opposite direction, hydraulic fluid flows through check valves 80 and 76 en route from the first common conduit to the second common conduit.

In FIGS. 2 and 3, vanes 90 are rotated by the wind, thereby rotating attached shaft 92 having sprocket 94. Drive chain 96 couples sprocket 94 and a sprocket on shaft 98 of hydraulic fluid pump 26. Shaft 92 rests on support bearing 93 and is held vertically by support 97 having four arms, each arm supported by a guy wire as for example guy wire 91. The guy wires are secured to suitable stationary objects, not shown. Support 79 is provided with bearing 95.

Figure 4:
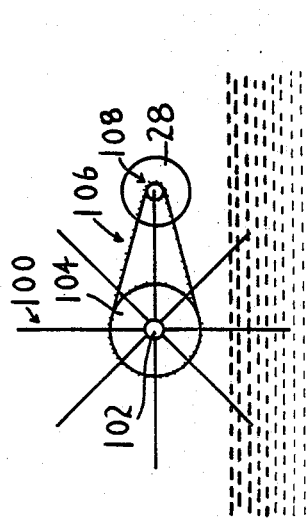
FIG. 4 is a diagramatic representation of a paddle wheel for powering a fluid pump as an example of a receptor for kinetic energy from water currents which may be used in the energy farm.

In FIG. 4, vanes 100 of the paddle wheel are rotated around shaft 102. The supports for the shaft are not shown for simplicity. Shaft 102 rotates attached sprocket 104, the latter moves drive chain 106 which turns a sprocket on shaft 108 of hydraulic pump 28.

FIG. 5 shows sunlight concentrated by lens 120, the concentrated sunlight heating conduit 122 and vaporizing a liquid as for example water in the conduit. Vapor is produced and the pressure generated powers vapor pressure motor 124. Rotational energy is transferred from motor 124 via shaft 126 to pump 30. The vapor is condensed in conduit (heat exchanger) 128, as for example by cool water, and the vapor is condensed forming a liquid which is forced by pump 30 into conduit 122 where it is heated and converted into vapor again for a repetition of the cycle, pressure motor 124 being of a larger capacity or geared slower than pump 30. Pressure motor 124 additionally powers a hydraulic fluid pump, as for example pump 130 which may replace pump 26, 28, or 30 in FIG. 1.

Figure 6:
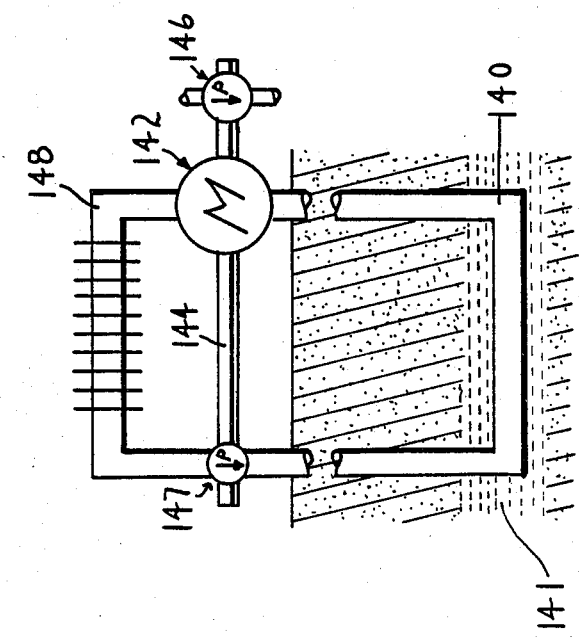
FIG. 6 is a diagramatic representation of a geothermal kinetic energy receptor for powering a pressure motor as a source of rotational energy for powering a pressure pump in the energy farm.

In FIG. 6 fluid, as for example methanol, in conduit 140 is heated by geothermal energy from underground hot water 141 forming vapor pressure in conduit 140 which powers pressure motor 142 thereby rotating shaft 144 for powering hydraulic fluid pump 146 and pump 147. The vapor is cooled in conduit and heat exchanger 148 and the liquid produced is forced via pump 147 into conduit 140 and the cycle is repeated.

Any other suitable natural kinetic energy heat receptors may be used, and a natural kinetic energy heat receptor having means for producing a back and forth motion typically is used to power piston type hydraulic pump 32, FIG. 1.

FIGS. 7 and 8 show propeller type wind receptors 150, 152, coupled by shaft 153 and propeller type wind receptors 154 and 156 coupled by shaft 158. Shafts 153 and 158 are coupled by drive chain 160 which turns on sprockets on the shafts. The shafts are mounted via ball bearing pillow blocks to supports which are welded to vertical poles 162 and 164, the poles being held in place by guy wires 168 and 170. Shaft 153 is coupled to hydraulic pump 28 having first and second communicating conduits 48 and 36 coupled respectively with the first common conduit 44 and the second common conduit 42, FIGS. 1, 9, 10, 11, and 12. This stationary type of wind receptor facing the wind may be used where the wind always blows from the same direction, and is an example of a compound wind receptor having individual receptors coupled by mechanical means. Gears or any suitable mechanical means may be used in place of a drive chain for coupling the individual receptors.

Figure 10:
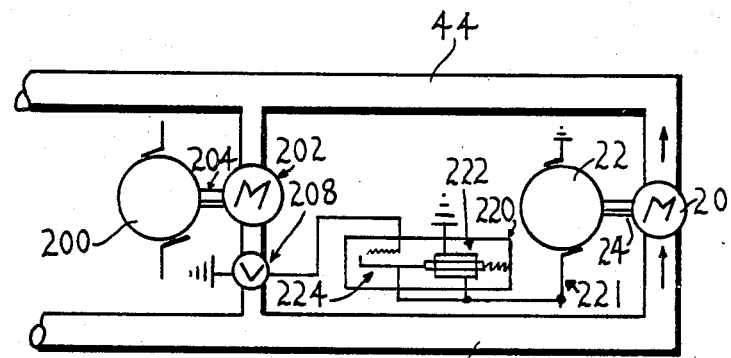

FIGS. 9 through 12 show pressure motor 20 powering electricity generating unit 22 via shaft 24 as in FIG. 1. FIGS. 9 and 10 show means for tending to maintain the rotational speed of pressure motor 20 (and electricity generating unit 22) within predetermined rotational speeds by directing the flow of hydraulic fluid from a second common conduit 42 to the first common conduit 44 through pressure motor 20 until shaft 24 (pressure motor 20 and generating unit 22) reach a predetermined rotational speed, following which hydraulic fluid under pressure is allowed to pass from the second common conduit 42 to the first common conduit 44 via pressure motor 202.

Shaft 24, FIG. 9, extends from generator 22 to control switch 206, and "hot" lead 207 from generator 22 is coupled with said control switch. Said control switch comprises means for the variable control of electric current as for example spring-loaded governor activating element 208 for adjusting the movable contact of switching element and rheostat 210 for causing current to begin to flow through control switch 206 when the rotational speed of shaft 24 reaches a predetermined speed and increasing the flow of current through said control switch as the rotational speed of shaft 24 increases.

Control switch 206 is electrically coupled to electrically activated valve 208. Typically, electrically activated valve 208 comprises means for variable control of the flow of hydraulic fluid to pressure motor 202 in proportion to the flow of electrical energy flowing through control switch 206 to valve 208. For example, control valve 208 typically comprises a hydraulic plunger valve and a linear control solenoid for activating the plunger valve. When valve 208 is electrically activated, hydraulic fluid under pressure flows from the second common conduit 42 to the first common conduit 44 via communicating conduit 212, pressure motor 202, and communicating conduit 214. Pressure motor 202 is coupled to generator 200 by shaft 204.

Control switch 220, FIG. 10, is sensative to a factor of the electrical output of electricity generating unit 22, as for example the voltage or current flow. Control switch 220 may comprise, as for example, spring-loaded solenoid 222 (coupled with hot lead 221 and the grounded lead of electricity generating unit) for adjusting the movable contact of switching element and rheostat 224. When a factor of the electrical output of electricity generating unit 22 attains a predetermined limit, electric current passes through control switch 220 for activating valve 208; increased electrical output results in increased fluid flow through valve 208. Control switch 220 may be sensitive to the frequency of the electrical output of generator 22 so that when the electrical output of generator 22 reaches a predetermined frequency, electric current will commence to flow through control switch 220 to valve 208 for permitting the hydraulic fluid to flow to pressure motor 202.

Figure 11:
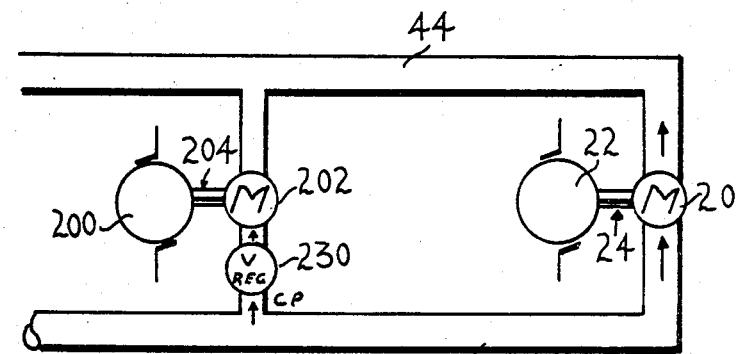

FIG. 11 shows constant pressure inlet valve 230 for preventing the flow of hydraulic fluid from the second common conduit 42 to the first common conduit 44 via pressure motor 202 until the pressure in the second common conduit 42 reaches a predetermined pressure, following which hydraulic fluid is permitted to flow from the second common conduit 42 to the first common conduit 44 via pressure motor 202. Thus hydraulic fluid in the second common conduit 42 is directed through pressure motor 20 until said pressure motor is operating at the predetermined pressure above which the constant pressure inlet valve 230 allows the flow of hydraulic fluid through pressure motor 202.

Figure 12:
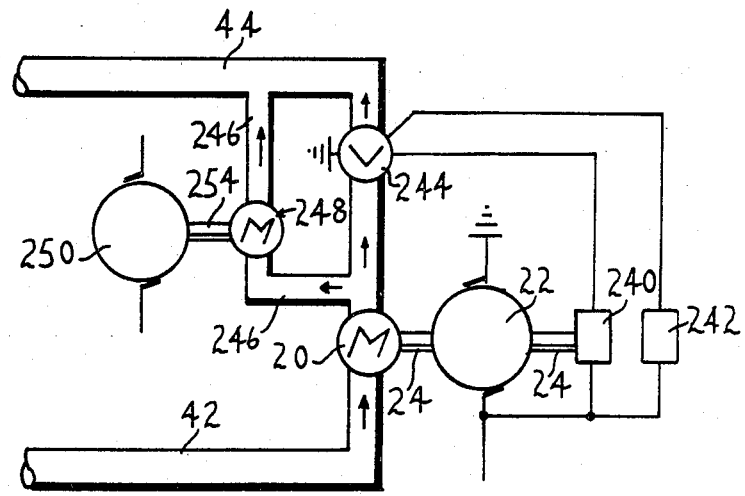

In FIG. 12, all of the hydraulic fluid under pressure in the second common conduit 42 flows through pressure motor 20 which powers electricity generating unit 22 via shaft 24. Electrically activated valve 244 is typically similar in structure to valve 208, FIGS. 9 and 10, except that valve 244 is normally open for permitting the discharge of hydraulic fluid from pressure motor 20 directly to the first common conduit 44. When valve 244 is electrically activated by governor controlled switch 240 or alternative control switch 242, hydraulic fluid discharged from pressure motor 20 is forced through communicating conduit 246 and pressure motor 248 for powering generator 250 via shaft 254.

Governor controlled switch 240 is similar in structure to governor controlled switch 206, FIG. 9. Alternative control switch 242 is similar in structure to control switch 220, FIG. 10. Switch 242 is responsive to the voltage and/or current output of electricity generating unit 22. Switches 240 and 242 control the maximum rotational speed of pressure motor 20 by increasing the resistance to the flow of hydraulic fluid discharged from pressure motor 20 en route to the first common conduit 44 by closing electrically activated valve 244.

In this specification and the appended claims, the term "electricity generating unit" refers to any suitable device for generating electricity as for example a generator or alternator. The electricity generating units may be AC or DC and may be single phase, three phase or any suitable phase type. The electricity generating units may be coupled with power lines from another power source having AC output by using appropriate converters for synchronizing the phase of the electrical output produced by the generators in the invention herein described, or generators may be used which generate electricity in synchronous phase with the current in the lines from the other power source.

Accumulator 201, FIG. 9, or any other suitable means may be coupled with the second common conduit 42 for temporary storage of hydraulic fluid under pressure and/or for reducing pulsations and variations in hydraulic pressure. Storage tank 103 for hydraulic fluid, FIG. 9, may be coupled with first common conduit 44 for insuring an adequate supply of hydraulic fluid in the system. The storage tank may be elevated or any other suitable means may be used to increase the pressure in the first common conduit to a desired operating pressure so that hydraulic fluid will flow to hydraulic pump(s) which may be elevated a substantial distance above the ground.

One or more hydraulic pumps may be used in the system. One or more forms of natural kinetic energy may be used for powering the energy receptors. That is, wind may be the only source of natural kinetic energy powering the energy farm, a combination of wind and solar energy may be used, energy from tides alone may be used or may be used in combination with the wind and solar energy to power the energy farm, etc.

The shaft of the natural kinetic energy receptor shown in FIG. 4 for use in water currents may be supported by a buoy or other floatation means located on each end of the shaft, and the shaft may be maintained at a predetermined distance from the shore by "arms" extending from the shore. As an alternative to floatation means supporting each end of the shaft, a floatation cylinder may surround the shaft. A propeller shaped natural kinetic energy receptor for use in water currents may be supported by a buoy or other floatation means, or maybe secured to a stationary framework supported by terra firma.

Although the piston of pump 32, FIG. 1, is shown to be reciprocated by the action of cam shaft 64 and rod assembly, any suitable means for reciprocating the piston may be used. Cam shaft 64 may be rotated by coupling the cam shaft to any suitable natural kinetic energy receptor as for example the wind receptor shown in FIGS. 2 and 3, the paddle wheel shown in FIG. 4, or the like.

It will be appreciated that more than two fluid pressure motors may be used in the energy farm, the additional pressure motors being coupled with additional electricity generating devices. Means may be provided for the second electricity generating device to be rotated at a desired speed before a third electricity generating unit is powered by fluid pressure etc.

Various additional modifications and extensions of this invention will become apparent to those skilled in the art. All such variations and deviations which basically rely on the teachings through which this invention has advanced the art are properly considered to be within the spirit and scope of this invention.

What is claimed:

1. An energy farm for the conversion of natural kinetic energy into electrical energy, comprising:
   (A) a first common conduit for the flow of fluid;
   (B) a second common conduit for the flow of fluid;
   (C) a fluid pressure pump;
   (D) a first bridging conduit communicating with the first and second common conduits and communicating with the fluid pressure pump;
   (E) a second bridging conduit communicating with the first and second common conduit and communicating with the fluid pressure pump;
   (F) a first check valve in the first bridging conduit located between the first common conduit and the fluid pressure pump for preventing back flow of fluid from the fluid pressure pump to the first common conduit;
   (G) a second check valve in the first bridging conduit located between the fluid pressure pump and the second common conduit for preventing the back flow of fluid between the second common conduit and the fluid pressure pump;
   (H) a first check valve in the second bridging conduit located between the first common conduit and the fluid pressure pump for preventing the back flow of fluid from the fluid pressure pump and the first common conduit;
   (I) a second check valve in the second bridging conduit located between the second common conduit and the rotary type fluid pressure pump for preventing the back flow of fluid from the second common conduit to the fluid pressure motor;
   (J) a natural kinetic energy receptor coupled to the fluid pressure pump for activating the pump for moving hydraulic fluid from the first common conduit to the second common conduit and generating hydraulic pressure in the second common conduit;
   (K) a fluid pressure motor coupled to the first common conduit and the second common conduit for providing the passage of fluid between the second common conduit and the first common conduit and for generating rotational energy as fluid flows from the second common conduit to the first common conduit;
   (L) an electricity generating unit coupled to the fluid pressure motor for converting the rotational energy to electrical energy.

2. The energy farm as defined in claim 1, further comprising:
   (A) a second fluid pressure motor coupled to the first common conduit and to the second common conduit for providing a second passage for the flow of fluid from the second common conduit to the first common conduit and for generating rotational energy as the fluid flows from the second common conduit to the first common conduit;
   (B) an electricity generating unit coupled to the second fluid pressure motor for converting the rotational energy to electrical energy;
   (C) a constant pressure inlet valve located between the second common conduit and the second fluid pressure motor for preventing the flow of fluid through the second pressure motor until the pressure in the second common conduit is above a predetermined pressure.

3. The energy farm as defined in claim 1, further comprising:
   A. a second fluid pressure motor coupled to the first common conduit and to the second common conduit for providing a second passage for the flow of fluid from the second common conduit to the first common conduit for generating rotational energy as the fluid flows from the second common conduit to the first common conduit;
   B. an electricity generating unit coupled to the second fluid pressure motor for converting the rotational energy to electrical energy;
   C. an electrically operated valve located between the second common conduit and the second pressure motor for preventing the flow of fluid from the second common conduit to the second fluid pressure motor until the electrically operated valve is activated;
   D. a governor activated control switch responsive to the rotational speed of the first electricity generating unit for activating the electrically operated valve when the rotational speed of the first electricity generating unit is above a predetermined rotational speed.

4. The energy farm as defined in claim 1 further comprising:
   A. a second fluid pressure motor coupled to the first common conduit and to the second common conduit for providing a second passage for the flow of fluid from the second common conduit to the first common conduit and for generating rotational energy as the fluid flows from the second common conduit to the first common conduit;
   B. an electricity generating unit coupled to the second fluid pressure motor for converting the rotational energy to electrical energy;
   C. an electrically operated valve located between the second common conduit and the second pressure motor for preventing the flow of fluid from the second common conduit to the second fluid pressure motor until the electrically operated valve is activated;
   D. a control switch responsive to a factor of the electrical output of the first electricity generating unit for activating the electrically operated valve and permitting the flow of fluid from the second common conduit to the second fluid pressure motor when the factor of the electrical output of the first electricity generating unit reaches a predetermined limit.

5. The energy farm as defined in claim 1, further comprising:

(A) a second fluid pressure motor coupled to the first fluid pressure motor and the first common conduit;
(B) an electrically controlled valve for preventing the flow of the fluid directly from the first fluid pressure motor to the first common conduit when the electrically controlled valve is activated, and thereby forcing fluid being discharged from the first pressure motor to flow through the second pressure motor en route to the first common conduit when the electrically operated valve is activated;
(C) a governor operated control switch responsive to the rotational speed of the first electricity generating unit for activating the electrically controlled valve when the first electricity generating unit is rotating above a predetermined speed.

6. The energy farm as defined in claim 1, further comprising:

(A) a second fluid pressure motor coupled to the first fluid pressure motor and the first common conduit;
(B) an electrically controlled valve for preventing the flow of the fluid directly from the first fluid pressure motor to the first common conduit when the electrically controlled valve is activated, and thereby forcing fluid being discharged from the first pressure motor to flow through the second pressure motor en route to the first common conduit when the electrically operated valve is activated;
(C) a control switch responsive to a factor of the electrical output of the first electricity generating unit for activating the electrically activated valve when a factor of the electrical output of the first electricity generating unit is above a predetermined limit.

* * * * *